(No Model.) 5 Sheets—Sheet 1.

J. R. JONES & J. W. SCOTT.
RAILWAY ALARM SIGNAL.

No. 448,963. Patented Mar. 24, 1891.

(No Model.) 5 Sheets—Sheet 2.
J. R. JONES & J. W. SCOTT.
RAILWAY ALARM SIGNAL.
No. 448,963. Patented Mar. 24, 1891.
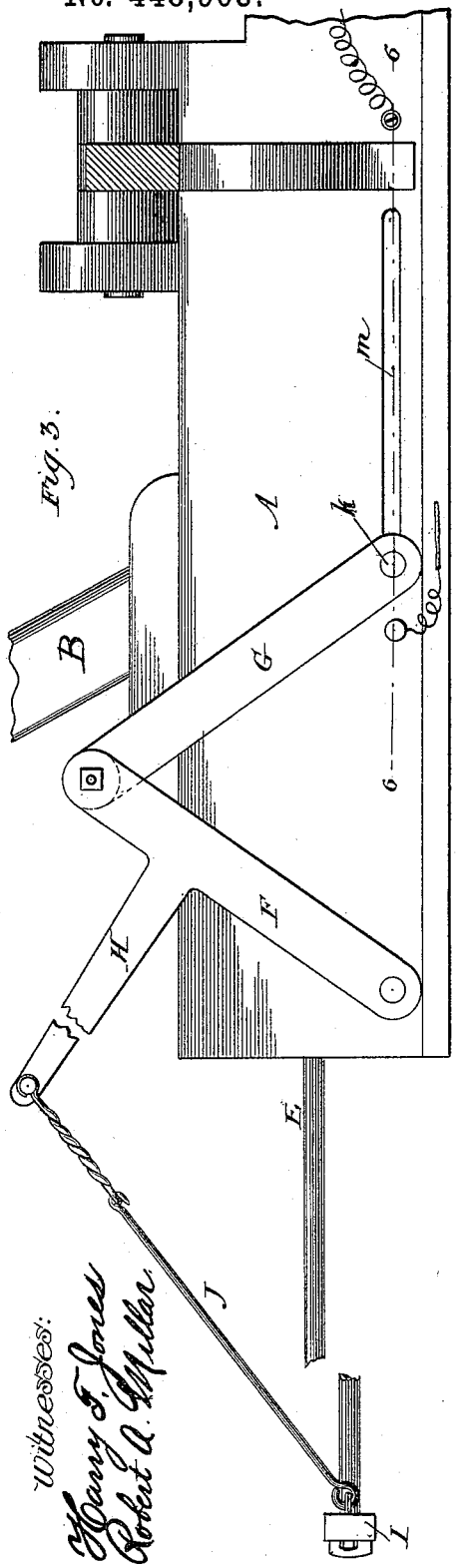
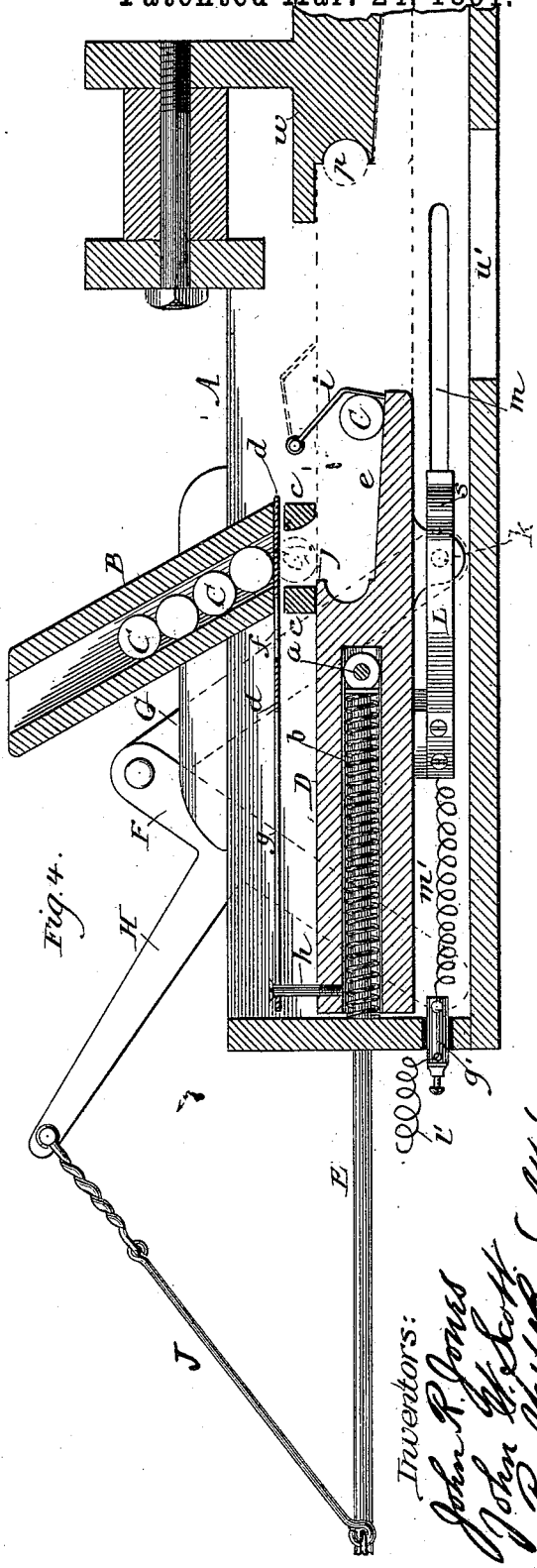
Witnesses: Henry F. Jones, Robert A. Miller
Inventors: John R. Jones, John W. Scott (No Model.) 5 Sheets—Sheet 3.
J. R. JONES & J. W. SCOTT.
RAILWAY ALARM SIGNAL.
No. 448,963. Patented Mar. 24, 1891.
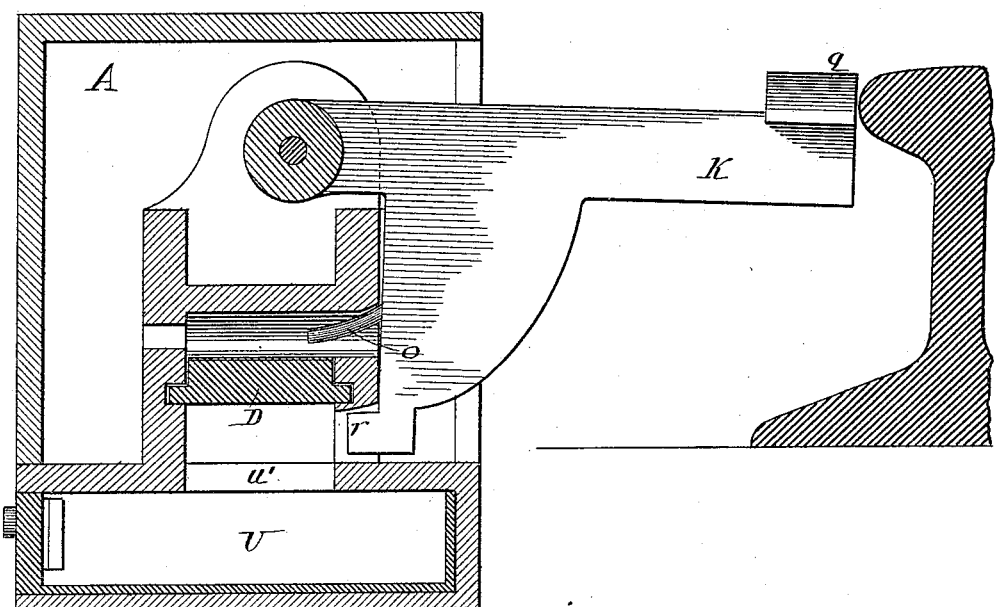
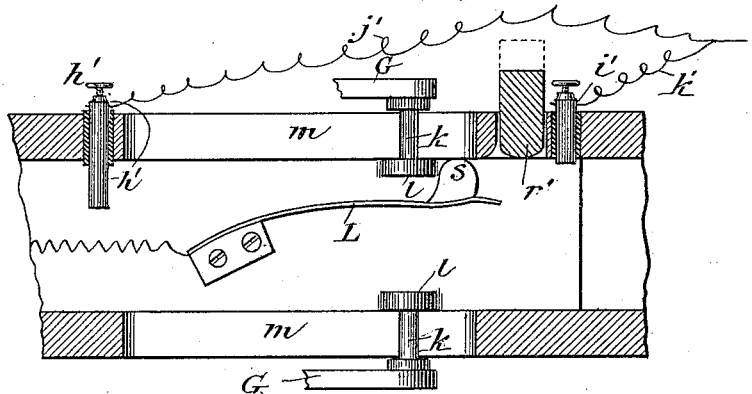
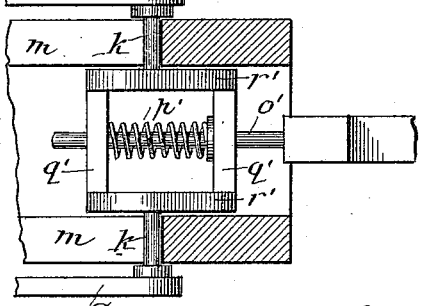
Witnesses:
Harry T. Jones
Robert A. Miller
Inventors:
John R. Jones
John W. Scott
By West & Bond,
Attys.

(No Model.) 5 Sheets—Sheet 4.
J. R. JONES & J. W. SCOTT.
RAILWAY ALARM SIGNAL.
No. 448,963. Patented Mar. 24, 1891.
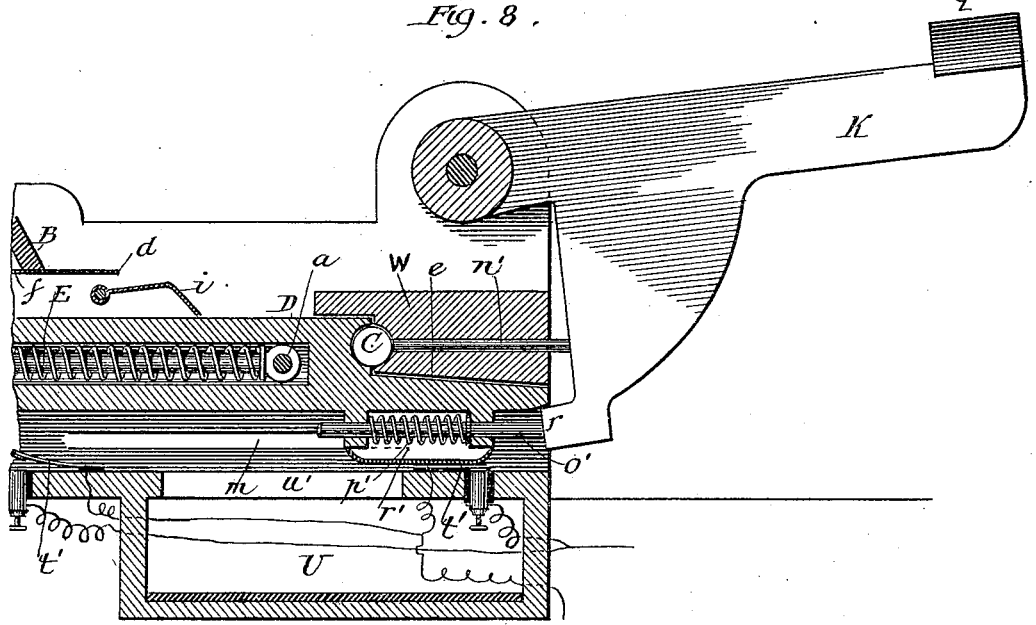
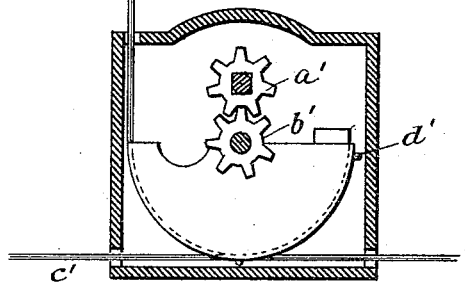
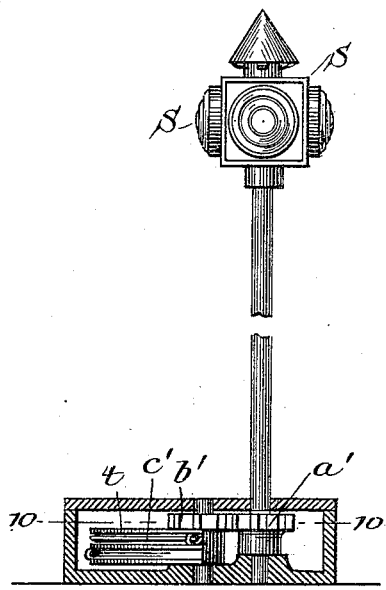
Witnesses:
Harry T. Jones
Robert A. Millar
Inventors:
John R. Jones
John W. Scott
By West & Bond, Attys

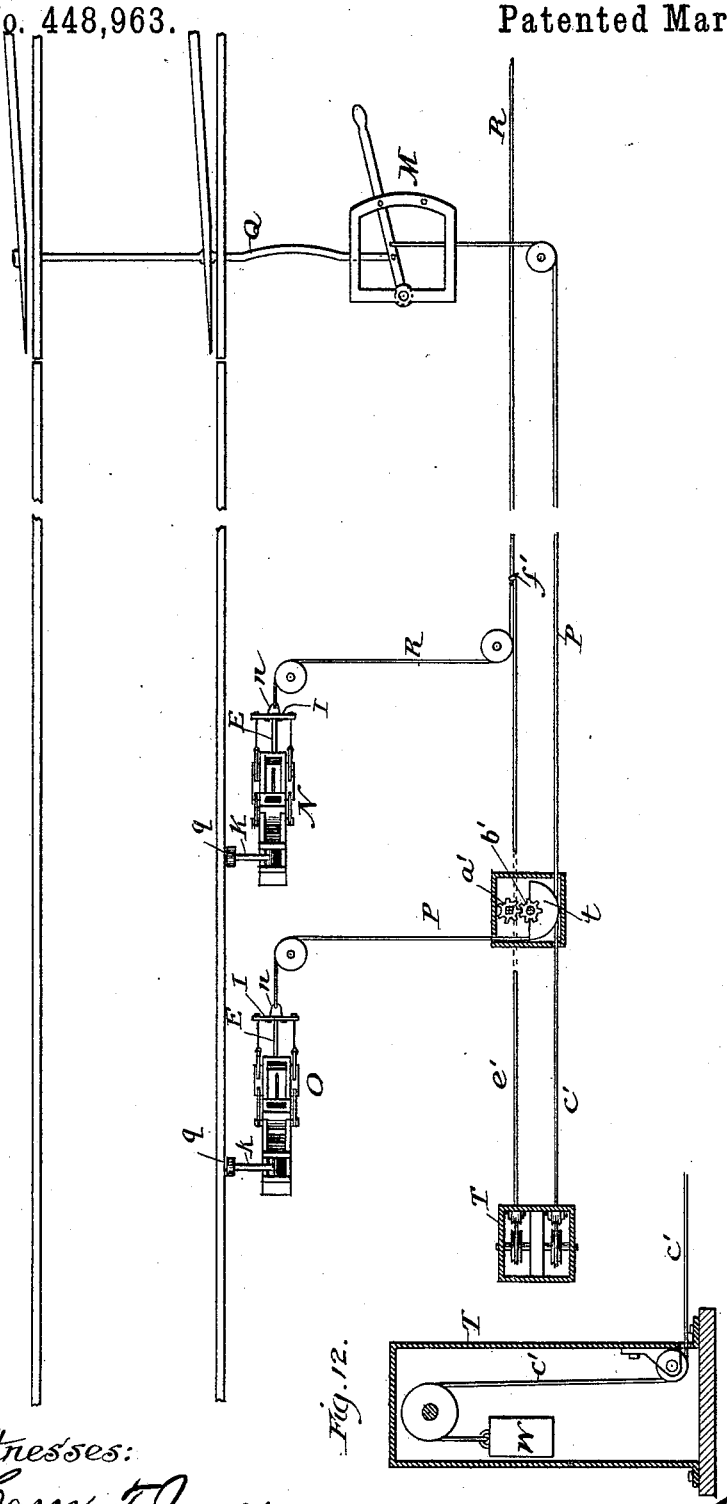

UNITED STATES PATENT OFFICE.

JOHN R. JONES AND JOHN W. SCOTT, OF ARLINGTON, ILLINOIS.

RAILWAY ALARM-SIGNAL.

SPECIFICATION forming part of Letters Patent No. 448,963, dated March 24, 1891.

Application filed March 17, 1890. Serial No. 344,206. (No model.)

*To all whom it may concern:*

Be it known that we, JOHN R. JONES and JOHN W. SCOTT, both residing at Arlington, Bureau county, Illinois, and citizens of the United States, have invented a new and useful Improvement in Railway Alarm-Signals, of which the following is a specification, reference being had to the accompanying drawings, in which—

Figure 1:
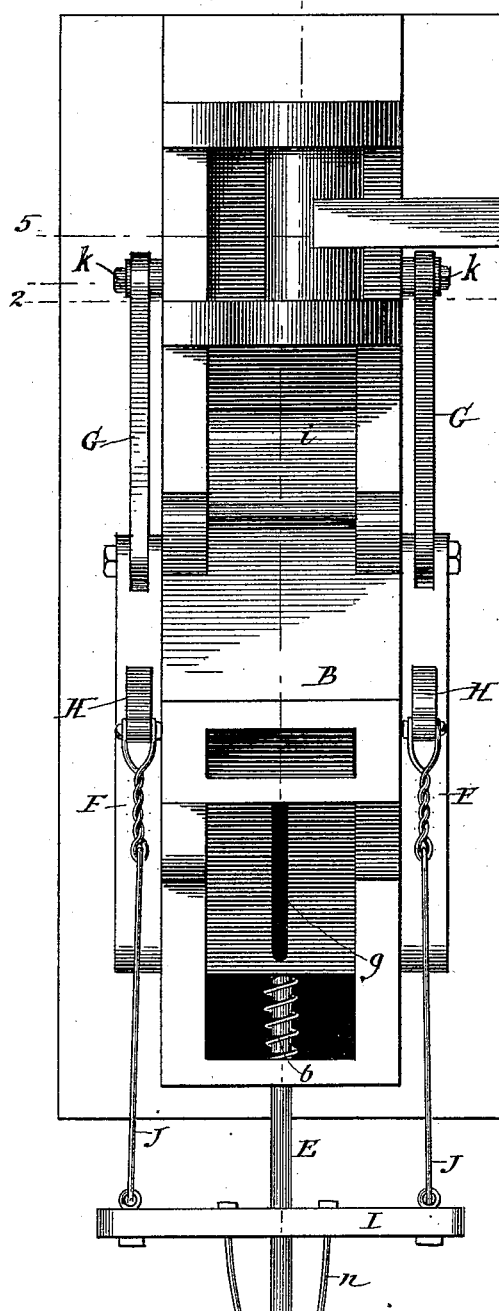
Figure 1:
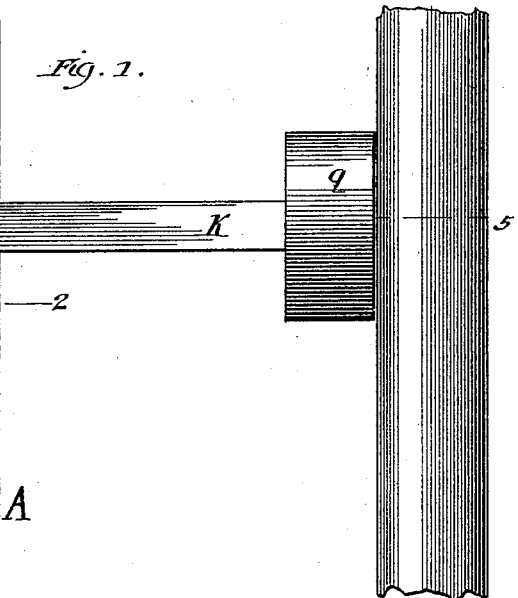
Figure 2:
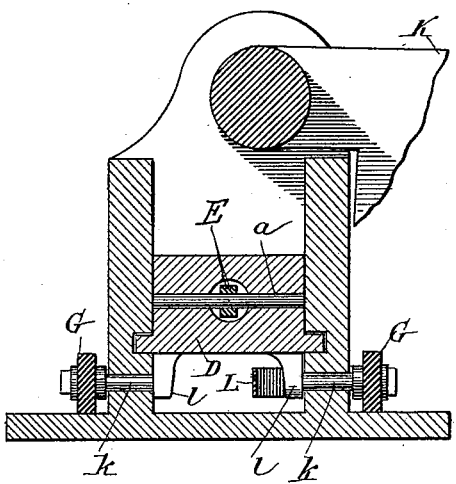

Figure 1 is a plan. Fig. 2 is a cross-section at line 2 2 of Fig. 1. Fig. 3 is a side elevation. Fig. 4 is a vertical section at line 4 4 of Fig. 1. Fig. 5 is a cross-section at line 5 of Fig. 1. Fig. 6 is a detail and is a section of so much as is shown, taken at line 6 of Fig. 3, looking upward. Fig. 7 is a detail showing one part of a modification. Fig. 8 represents a modification and is a vertical longitudinal section of one end of the device, the parts being in the position which they occupy when a torpedo is ready to be fired. Fig. 9 is an elevation showing a signal-lamp and devices for operating the same in connection with the alarm-signal devices. Fig. 10 is a section at line 10 of Fig. 9. Fig. 11 is an illustrative diagram. Fig. 12 is a detail showing a weight which aids in operating the lamp.

All the figures, except 9, 10, 11, and 12, are half-size.

The leading object of our invention is to provide improved devices for signaling trains when approaching an open switch or approaching a station when a train is standing there on the track over which the approaching train is coming, which we accomplish by arranging at a suitable distance from the switch or station a torpedo-holder, devices to bring a torpedo into position to be fired, firing devices arranged to be operated by a wheel of the locomotive of a passing train, and by providing devices by which the switch-tender or an officer at the depot can bring these torpedoes into proper position for use.

Other objects of our invention are to provide a signal-light operated at the same time that the torpedo devices are brought into proper position for use, and electric devices for automatically communicating from the torpedo devices to the depot. All of which we accomplish, as illustrated in the drawings and as hereinafter described That which we claim as new will be pointed out in the claims.

In the drawings, A is a box, which may be made of any suitable material, which box is provided with a holder or chamber B, adapted to receive a number of torpedoes C.

D is a sliding block supported in grooves on the inside of the side walls of the box A. The forward end of this block is partly cut away and the remaining surface $e$ is inclined.

E is a metal rod, one end of which extends some distance into the chamber in the block D, to which it is secured by means of a pin $a$.

$b$ is a coiled spring located in said chamber in the block D, which spring surrounds the rod E, the tendency of which spring when compressed being to force the block D forward.

$c$ are two cross-bars.

$d$ is a plate beneath the chamber which receives the torpedoes. This plate is provided with two slots, one of which $f$ is short and the other $g$ is long.

$h$ is a pin or screw secured in the block D and passing through the slot $g$ in the plate $d$.

$i$ is a hinged piece arranged, as shown, for the purpose of preventing the torpedo from passing over the forward end of the block D until the point $j$ at the forward end of the upper portion of said block comes in contact with such hinged piece, lifting it to the position shown by dotted lines in Fig. 4 and full lines in Fig. 8, which will take place when the block D has moved forward to a position similar to that shown in Fig. 8. The hinged piece $i$ also pushes the shell of an exploded torpedo from the block D upon the return movement of said block D.

F G are toggle-levers arranged on opposite sides of the box, the lower end of one lever being pivoted to the box and the lower end of the other lever being secured by means of a pin $k$ to an ear $l$, which is secured to the under side of the block D. The pins $k$ pass through slots $m$ in the side walls of the box.

H are arms, one of which is connected with each of the levers F.

I is a sliding bar on the rod E.

J are rods which connect the arms H with the sliding bar I.

$n$ is a loop connected with the bar I.

K is a firing-lever pivoted in suitable bearings on one side of the box A, as shown in Figs. 1 to 5, inclusive. This lever is provided with a pin $o$, which is arranged to come in contact with one end of a torpedo when in position to be fired, which is when the torpedo is at $p$, Fig. 4, where it will be held by the block D against a fixed part $w$ of the box. A torpedo is shown in the same position in Fig. 8; but in this figure the lever to fire the torpedo is arranged at the end of the box, as will more fully appear when this modification is described. On the outer end of this firing-lever there is a shoe $q$, which is arranged in close proximity to one of the rails of the track. When this lever is in the position shown in Fig 5, the shoe $q$ will be on a line with the top of the rail, and the wheel of the locomotive as it passes will not touch such shoe; but if the free end of the lever be elevated a little and brought into a position such as is shown in Fig. 8, whether the lever is on the side or at the end of the box, then when the locomotive passes its driving-wheel, being broad, will pass over such shoe. $r$ is the heel of this lever.

L is a spring, which carries a projecting piece $s$ near its free end, which piece $s$ is arranged to come in contact with the heel $r$ of the lever K when the block D is pushed forward, and the action of the spring will force the free end of the lever up in position to be acted upon by a locomotive-wheel. This spring is secured to a small block, which is secured to the under side of the block D. (See Figs. 4 and 6.)

In Fig. 11 we have shown by a diagram one way of arranging two torpedo devices so that one of them may be brought into proper position for action by the operation of a switch and the other by an operator at the depot. In this figure M represents a switch; N, one of our torpedo-boxes and other devices connected therewith; O, another of such boxes and devices; P, a chain, one end of which is attached to the loop $n$ of the device O, which chain passes over suitable pulleys to a switch-bar Q, which is operated by a switch-lever, as usual. R is a chain attached to the loop $n$ of the device N, which chain passes over suitable pulleys to a lever arranged in the office of the telegraph-operator or at other suitable place in the depot. In this diagram the chain P is represented as passing over a half-pulley $t$; but the operation would be the same if at this point there was an ordinary pulley like the others which are shown.

S is a signal-lamp mounted on a shaft supported in bearings at its lower end and carrying a pinion $a'$, which engages with a second pinion $b'$, with which pinion the half-pulley $t$ is connected. One end of a chain $c'$ is secured at $d'$ to this half-pulley, which chain $c'$ passes under and over proper pulleys, as shown in Fig. 12, and carries at its other end a weight W, the two pulleys and the weight being inclosed in a case T.

$e'$ (see Fig. 11) is another chain, one end of which is connected with the chain R at $f'$. This chain $e'$ passes into the case T, and there is provided with a weight similar to the weight connected with the chain $c'$, suitable pulleys being provided for the chain $e'$.

$g'$ (see Fig. 4) is a binding-post.

$h'$ $i'$ (see Fig. 6) are two other binding-posts.

$j'$ is an electric wire which runs to the depot.

$k'$ is a wire which connects the binding-post $i'$ and the wire $j'$.

$l'$ is a wire which runs from the binding-post $g'$ to the depot.

$m'$ is a wire which connects the binding-post $g'$ and the spring L.

When the parts are in the position shown in Figs. 3, 4, and 5, they are in the safety position, and the lever K so depressed at its free end that the shoe $q$ will not be touched by a passing locomotive.

The switch-tender can at any time bring the devices into the position shown in said three figures by placing the switch and switch-lever in the position shown in Fig. 11, and through the chain P the rod E will be drawn out and with it the block D will be brought to the position shown in Fig. 4, and the parts will remain in that position until the switch-lever is released. The operator at the depot can bring the parts of the other box (represented at N in Fig. 11) into similar position by means of a suitable lever, not shown in in the drawings.

If now the switch-tender desires to have a torpedo in the box O exploded when a train passes such box, he must move the switch-lever over to the other side of the switch-frame, which will relax the chain P, and the action of the spring $b$ will force the block D forward in the box A and the torpedo (shown in Fig. 4) resting on the incline $e'$ which torpedo has been brought into place by a former action, being held by the hinged piece $i$, will remain in that position while the forward end of the block D passes under it, and when the point $j$ on the block D comes in contact with the hinged piece $i$ such piece will be lifted up and the torpedo on the incline will be brought to the position shown in Fig. 8 and be held firmly there in position to be fired. At the same time the action of the spring L and projection $s$ on the heel $r$ of the lever will elevate its free end. Now when a locomotive passes on the track one of its driving-wheels, coming in contact with the shoe $q$, will force the lever K down, bring the firing-pin $o$ into contact with the end of the torpedo, and it will be exploded. When the block D moves forward, as already described, the pin $h$ moves in the slot $g$ in the plate $d$ until it reaches the end of such slot $g$, and then the plate $d$ is moved forward a little, bringing the slot $f$ beneath the lower end of the torpedo-chamber B, when a torpedo will fall through the slot $f$ onto the top of the block D. When the block D is returned to the position shown in Fig. 4, this last-mentioned torpedo will fall onto the incline $e$ and roll down thereon until its movement is arrested by the hinged piece $i$. When the block D has been carried forward by the action of the spring $b$, the toggles F G will be in a horizontal position, and they will remain in that position, until the rod E is again drawn out. The devices connected with the other box can be operated by the telegraph-operator or other person at the depot in substantially the same manner as described for the operation of the box O. The weights connected with the chains $c'$ $e'$ are designed to aid the action of the springs in the boxes on the chains P and R. When the block D has been carried forward to its extreme limit, the free end of the spring L will come in contact with the binding-post $i'$, and a bell being provided at the depot and placed in the circuit a signal will be there given. So whenever the block D is brought to the position shown in Fig. 4 the spring L will come in contact with the post $h'$, completing the circuit and giving the signal at the depot, as before. Thus if any person tampers with the switch or with the devices connected with either of the torpedo-boxes, so as to bring the block D into the position shown in Fig. 8, or that shown in Fig. 4, the signal will be given at the depot. The signal-light S will be moved through the chain P whenever the switch-tender operates the switch. The chain P, passing over the half-pulley $t$, will cause the pinion $b'$ to move, and it being in engagement with the pinion $a'$ a partial rotation will be given to the shaft which carries the light.

In Fig. 8 I have shown a modification, the firing-lever being arranged at the end of the box instead of at the side, and the firing-pin being arranged to come in contact with the side of the torpedo instead of its end, a different spring also being provided to throw the lever K into the position shown in Fig. 8. Fig. 7 also represents a part of this modification. In these figures $n'$ is the firing-pin, $o'$ a pin operated by a spring $p'$ to raise the lever K. The pin $o'$ is supported in bearings $r'$ in pieces $q'$, secured to the under side of the block D, and pins $k$ are connected with blocks which are also secured to the under side of the block D, substantially as before described. When this modification is used, wires for signaling from the box to the depot are used, substantially as before described, although the arrangement of the connecting parts is not exactly the same, but will be sufficiently understood without particular description, it being sufficient to say that $t'$ represents two springs, which are arranged to be brought into contact with one of the binding-posts by the movement of one of the blocks $r'$ over such springs.

Beneath the box A there is a chamber U, into which the shells of the torpedoes can fall, through an opening $u'$ in the bottom of the box A, when the block D is drawn back.

The chamber B can be filled with torpedoes daily, or as often as occasion requires.

What we claim as new, and desire to secure by Letters Patent, is as follows:

1. A box provided with a chamber for torpedoes, in combination with a sliding block partly cut away at its forward end and adapted to support a cylindrical torpedo, a rod E, connected with such block, a spring $b$, pressing said block forward, a fixed block $w$, adapted to engage a cylindrical torpedo, and a lever provided with a pin adapted to fire a torpedo held by the sliding block and fixed block, substantially as specified.

2. A box A, having a chamber for torpedoes, in combination with a sliding block partly cut away at its forward end, a rod E, fixed block $w$, a stop, as $i$, to hold a torpedo at the forward end of the sliding block, and a lever for firing a torpedo, substantially as and for the purposes specified.

3. A box provided with a chamber for torpedoes, in combination with a sliding block D, a rod E, spring $b$, sliding slotted plate $d$, screw or pin $h$, fixed block $w$, stop $i$, toggle-levers F G, arms H, connections between the arms H and rods E, and a lever for firing a torpedo, substantially as and for the purposes specified.

4. A box having a chamber for torpedoes, in combination with a sliding block, a sliding plate $d$, a firing-lever K, and a spring to act on the heel of such lever, substantially as and for the purposes specified.

5. A box having a chamber for torpedoes, in combination with a sliding block D, a sliding plate $d$, rod E, spring $b$, toggle-levers F G, arms H, connections between the arms and rod E, firing-lever K, and a connection from the rod E to a switch, substantially as and for the purposes specified.

6. The combination, with a sliding block D, a firing-lever, and a spring to act on the heel of such lever, of a rod E, a chain connecting the rod E and a switch, and a spring $b$, whereby the sliding block is moved into firing position, and the firing-lever is raised, substantially as specified.

7. A box having a chamber for torpedoes and provided with slots $m$, in combination with a sliding block, toggle-levers F G, one F pivoted at one end to the box and the other G pivoted at one end to the sliding block, arms H, connections between the arms and rod E, and a firing-lever arranged to be operated by a wheel of a passing locomotive, substantially as and for the purposes specified.

8. A box having a chamber for torpedoes, a sliding block D, a firing-lever, connections from the block D to a switch, in combination with binding-posts connected with said box, electric wires running from the box to depot, and one or more contact-pieces connected with the sliding block D, substantially as and for the purposes specified.

JOHN R. JONES.
JOHN W. SCOTT.

Witnesses:
 EDWIN HAMLIN,
 CHARLES RIALE.